(12) United States Patent
Norton et al.

(10) Patent No.: US 10,976,179 B1
(45) Date of Patent: Apr. 13, 2021

(54) GEOLOCATING CONTENTS OF A VIDEO WITH DEVICE ORIENTATION, AND APPLICATION THEREOF

(71) Applicant: JETSY CORP., Lake Hiawatha, NJ (US)

(72) Inventors: Brett Norton, Lake Hiawatha, NJ (US); Jessie Blind, Lake Hiawatha, NJ (US)

(73) Assignee: Jetsy Corp., Lake Hiawatha, NJ (US)

( * ) Notice: Subject to any disclaimer, the term of this patent is extended or adjusted under 35 U.S.C. 154(b) by 0 days.

(21) Appl. No.: 16/938,590

(22) Filed: Jul. 24, 2020

(51) Int. Cl.
| | |
|---|---|
| *G01C 21/00* | (2006.01) |
| *G06F 3/01* | (2006.01) |
| *G01C 21/36* | (2006.01) |
| *G06F 16/787* | (2019.01) |

(52) U.S. Cl.
CPC ..... *G01C 21/3848* (2020.08); *G01C 21/3638* (2013.01); *G01C 21/3837* (2020.08); *G06F 3/017* (2013.01); *G06F 16/787* (2019.01)

(58) Field of Classification Search
CPC ............ G01C 21/3848; G01C 21/3837; G06F 16/787; G06F 3/017
USPC .......................................................... 348/135
See application file for complete search history.

(56) References Cited

U.S. PATENT DOCUMENTS

| | | | | |
|---|---|---|---|---|
| 2009/0092277 | A1* | 4/2009 | Ofek | ................ G06K 9/00664 382/100 |
| 2019/0180474 | A1* | 6/2019 | Li | ............................ G06T 7/75 |

OTHER PUBLICATIONS

Zheng, Y. et al., "Tour the World: Building a web-scale landmark recognition engine." *2009 IEEE Conference on Computer Vision and Pattern Recognition*; 8 pages.

* cited by examiner

*Primary Examiner* — Dakshesh D Parikh
(74) *Attorney, Agent, or Firm* — Sterne, Kessler, Goldstein & Fox P.L.L.C.

(57) ABSTRACT

In an embodiment, a computer-implemented method geolocates contents of a video with device orientation information. The method involves receiving a video captured by a camera on a mobile device. Parameters captured by sensors on the mobile device are also received. The parameters describe the mobile device's position and orientation while the mobile device captured the video. At least one ray from the mobile device's position is extended at an angle corresponding to an angle of view of the camera to determine a geographic area captured within the video.

17 Claims, 7 Drawing Sheets

GEOLOCATING CONTENTS OF A VIDEO WITH DEVICE ORIENTATION, AND APPLICATION THEREOF

BACKGROUND

Field

This field is generally related to geolocating photos.

Related Art

Mobile devices are computers small enough to be portable. Examples include smart phones and tablet computers. They can also include digital media players, digital cameras (including action cameras, like those available from GoPro, Inc. of San Mateo, Calif.), wearable computers (such as smart watches and augmented/virtual reality glasses), and drones. To allow interaction with the user, these mobile devices often contain a visual output, such as an LCD or OLED screen interface. They also have user inputs such as a touchscreen or other button interfaces. These devices can typically communicate via various communication interfaces such as Wi-Fi, Bluetooth, or cellular network interfaces.

These mobile devices also have a variety of sensors. For example, mobile devices typically have an image sensor, that is, a camera, capable of capturing still images and/or video. Often, mobile devices have various positioning sensors that detect or assist in detecting position and orientation of the mobile device. These include an accelerometer, magnetometer, and GPS receiver.

Users can use mobile devices to access various travel websites and applications, such as TripAdvisor available from TripAdvisor, Inc. of Needham, Mass. Some of these travel websites include user-generated content. User-generated content is any form of content, such as images, videos, text, and audio, that has been posted by users. Such user-generated content is common on social media sites such as Instagram and Facebook, both available from Facebook, Inc. of Menlo Park, Calif., which allow the upload of photos and videos from mobile devices, and sharing those photos and videos with other users. Users often use such sites, and their user-generated content, to try to plan vacations and travel.

One known way to identify content and images is to use object recognition techniques. Object recognition is technology in the field of computer vision that relates to identifying objects in an image or video sequence. Typically, these techniques involve applying a large number of example images of the object to train an algorithm. Once the algorithm is trained, the algorithm may be able to detect instances of the object in new images. In "Tour the world: Building a web-scale landmark recognition engine," *Fourth International Conference on Fuzzy Systems and Knowledge Discovery* (2007), Zheng et al. describe using these object recognition techniques to detect landmarks, such as well-known touristic buildings and attractions, in images and videos.

Improved methods are needed to allow users to use user-generated content to plan vacation and travel.

BRIEF SUMMARY

In an embodiment, a computer-implemented method geolocates contents of a video with device orientation information. The method involves receiving a video captured by a camera on a mobile device. Parameters captured by sensors on the mobile device are also received. The parameters describe the mobile device's position and orientation while the mobile device captured the video. At least one ray from the mobile device's position is extended at an angle corresponding to an angle of view of the camera to determine a geographic area captured within the video.

System, device, and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
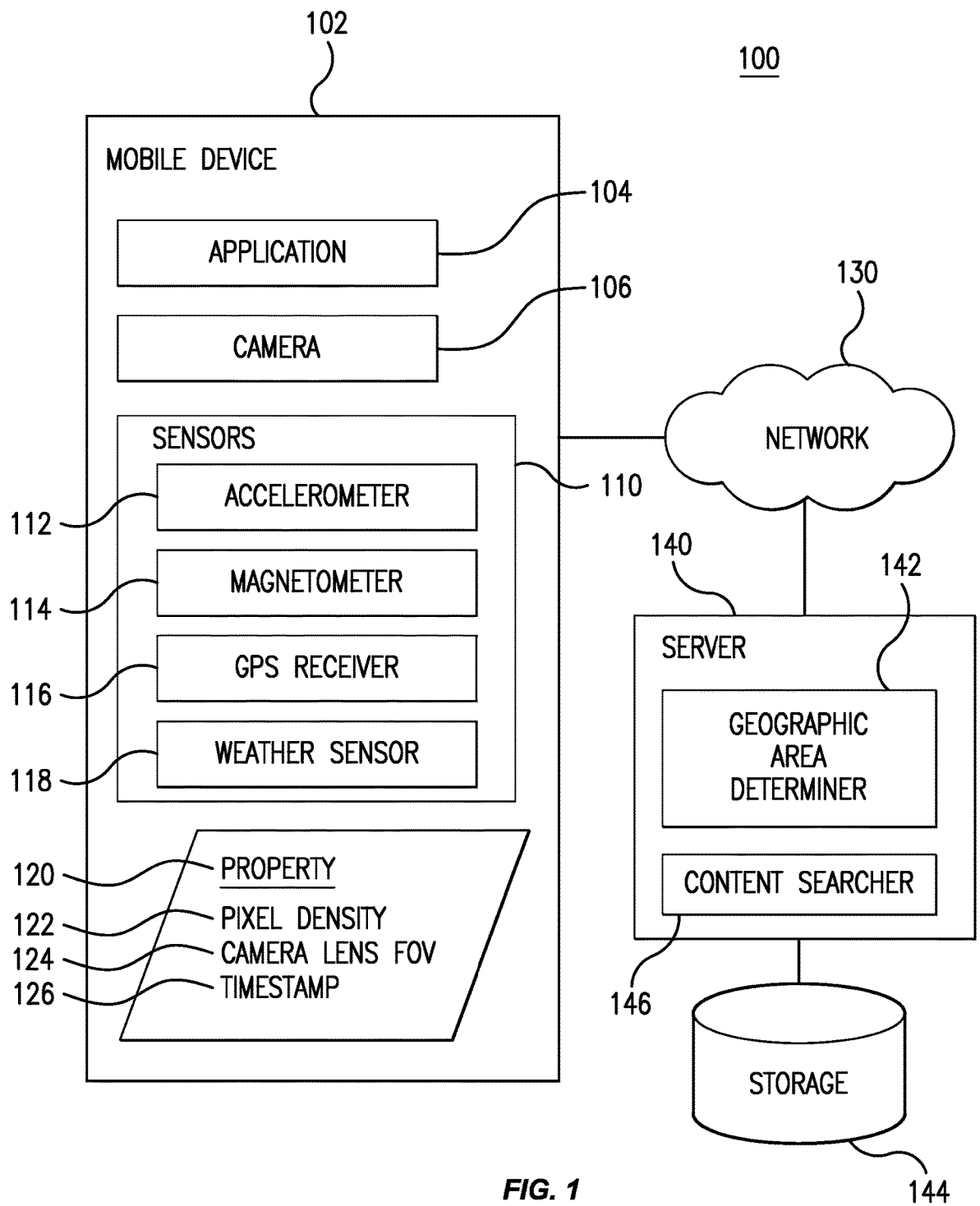
FIG. 1 is a diagram illustrating a system for geolocating contents of a photographic image, according to an embodiment.

FIG. 1 is a diagram illustrating a system 100 for geolocating contents of a photographic image, according to an embodiment. System 100 includes a mobile device 102 and a server 140 coupled by a network 130.

Mobile device 102 is a portable computing device such as a smartphone or tablet computer. It includes an application 104, camera 106, sensors 110, and properties 120.

Application 104 may be an application-installed software and run using a processor and local memory on mobile device 102. Application 104 may be downloaded from an application store. It may, for example, be a compiled, executable binary. Alternatively, application 104 may be a web-based application. For example, application 104 may be implemented in HTML and/or JavaScript and executed using a browser (not shown) on mobile device 102. Application 104 can interact with various hardware components, such as camera 104 and sensors 110, by accessing an operating system (not shown) of mobile device 102. Similarly, application 104 may be able to retrieve or determine properties 120 using the operating system of mobile device 102.

Application 104 interacts with server 140 to upload content generated by a user (not shown) of mobile device 102 and download content generated by other users of server 140. As will be described in greater detail below, application 104 and server 140 operate in concert to provide functionality described with respect to FIGS. 2-9. A skilled artisan would recognize that functionality to, for example, determine a geographic area contained within a still image or video and to retrieve images and videos can be allocated in various ways between application 104 and server 140. It may be advantageous to execute more functionality on application 104 to avoid incurring processing and computation time on server 140. On the other hand, it may be advantageous to execute more functionality on server 140 to avoid using limited battery power on mobile device 102.

Camera 106 captures image data by capturing light, generally through one or more lenses. Camera 106 includes an image sensor (not shown). The image sensor may, for example, be a charge coupled device (CCD) sensor or a complementary metal oxide semiconductor (CMOS) sensor. The image sensor may include one or more photodetectors that detect light and convert to electrical signals. These electrical signals captured together in a similar timeframe comprise a still photographic image. A sequence of still photographic images captured at regular intervals together comprise a video. In this way, camera 106 captures images and videos.

Sensors 110 are sensors available on mobile device 102. Sensors 110 include positioning sensors that capture information that can be used to determine a position and orientation of mobile device 102. Here, mobile device 102 includes four sensors 110: an accelerometer 112, a magnetometer 114, a GPS receiver 116 and a weather sensor 118.

Accelerometer 112 is a tool that measures proper acceleration. Accelerometer 112 may be a microelectromechanical system (MEMS) device. At rest on the Earth's surface, accelerometer 112 may measure an acceleration due to the Earth's gravity, in the direction of straight upwards from the surface, as substantially g=9.81 m/s2. By determining the direction of this 9.81 m/s acceleration with respect to mobile device 102, accelerometer 112 may be used to determine orientation of mobile device 102 with respect to a straight up or down vector on the surface. In this way, accelerometer 102 may be used to determine a pitch and roll of mobile device 102.

Magnetometer 114 is a device that measures magnetism—the direction, strength, and/or relative change of a magnetic field at mobile device 102. Like accelerometer 112, magnetometer 114 may be a microelectromechanical system (MEMS) device. Magnetometer 114 may have capability to adjust for magnetic declination, that is, to correct for any differences between magnetic north and true north. In other embodiments, this adjustment may be done by another component of mobile device 102, by server 140, or by another service not shown. By determining a direction of the Earth's magnetic field, magnetometer 114 may be used to determine a heading, or yaw, of mobile device 102. In this way, between accelerometer 112 and magnetometer 114, mobile device 102 is able to determine a pan, tilt, and yaw of device 102, including camera 106.

Global positioning system (GPS) receiver 116 is a device that is capable of receiving information from satellites, such as global navigation satellite system (GNSS) satellites, and then uses the received satellite signals to calculate the device's geographical position. The geographical position may be in spherical coordinates including, for example, latitude, longitude, and altitude.

Weather sensor 118 can include temperature and barometric sensors. These sensor can collect atmospheric data that can be used to help a search engine make more precise seasonal and weather related searches. For example, if a user is looking for sunny pictures, then most likely those will occur with high barometric pressure.

Properties 120 are properties of the device or of particular images. Properties 120 include pixel density 122, camera lens field of view (FOV) 124, and timestamp 126.

Pixel density 122 is a resolution of a still photographic image. The resolution may be a limitation of camera 106. Alternatively, the resolution may be a particular setting set on mobile device 102 describing an acceptable resolution to store images that balances image quality and storage availability. For example, pixel density 122 may be measured as the number of pixels in the distance in the vertical or horizontal direction (pixels per inch or pixels per centimeter). As will be described below, pixel density 122 is used to determine the furthest distance objects that can be seen when the image is magnified. Alternatively or additionally, an f-stop, which specifies a ratio of the lens focal length to the diameter of the entrance pupil of a camera of mobile device 102, may also be used.

Camera lens FOV 124 may represent an angle of light captured through a lens of camera 106. For example, the camera may capture light coming in 60° in a horizontal and vertical direction, directing light from within that 60° range to camera 106's image sensor. Again, this may be a fixed attribute of camera 106. Alternatively, it may be a setting of camera 106. For example, if the user has zoomed in, camera lens FOV 124 may change. This is true of both optical and digital zoom. In the case of digital zoom for example, camera lens FOV 124 may not represent the field of view of the actual lens of camera 106, but may instead represent the range of light that is ultimately captured in the photographic image. Camera lens FOV 124 may, for example, include four different measurements. Mobile device 102 may have a portrait mode and a landscape mode. When the camera is in portrait mode, a horizontal FOV is different from a vertical FOV. The same is true for when the camera is in landscape mode. This is because the spherical lens of the camera (which has a single FOV) is cropped to produce a rectangular picture resulting in different effective FOVs. Thus, camera lens FOV 124 may include a horizontal and vertical FOV for landscape mode and a horizontal and vertical FOV for portrait mode.

Timestamp 126 may simply be the time at which an image or video was captured. Mobile device 102 may have a clock and/or receive a time from an external source via network 130.

When camera 106 captures a still image or video, application 104 may transmit the still image or video, along with corresponding readings from accelerometer 112, magnetometer 114, GPS receiver 116, weather sensor 118 and corresponding properties 120, including pixel area, to server 140 via network 130. In an embodiment, only changed data may be sent. In that embodiment, application 104 evaluates what readings have changed since its last transmission and only send updated readings. This prevents duplicative and unnecessary transmissions. Application 104 may send a single set of readings for a still image, while it may sent multiple sets for a video, reflecting how readings have changed.

In an embodiment, application 104 may use steganography to conceal information in a picture without visibly changing the picture. This may provide an advantage of only requiring upload of a single file.

Server 140 includes a geographic area determiner 142 and content searcher 146, and is coupled to storage 144. Server 140 is a computing device, perhaps cloud-based, and includes processor and memory. Server 140 executes geographic area determiner 142 and content searcher 146, which are implemented in software, firmware, hardware, or any combination thereof. Server 140 may interact with other services, not shown. For example, Server 140 may query other data source for reverse geocoding, magnetic declination information, topographical maps, and to build polygons.

When server 140 receives the photo (or video) and corresponding sensor readings and properties from mobile device 102, server 140 sends them to geographic area determiner 142. Geographic area determiner 142 calculates the geographic area captured within the photographic image. To do that, geographic area determiner 142 extends at least one ray from the mobile device's position. The ray is extended at an angle corresponding to an angle of view of the camera to determine a geographic area captured within the video. Further discussion of how geographic area determiner 142 operates is described below, for example, with respect to FIGS. 2, 3A, 4, and 5. When a geographic area is determined, geographic area determiner 142 stores it along with the corresponding photo or video in storage 144.

Storage 144 can be any type of persistent storage, including cloud-based persistent storage, such as the S3 storage available from Amazon, Inc. of Seattle, Wash.

A user of mobile device 102 may seek to view other photos and videos of the same area. To do that, they may provide an input on mobile device 102 which causes application 104 to send a search query to server 140 for execution by content searcher 146. The search query may identify a geographic location and ask for a photo or video of the geographic location. In this case, content searcher 146 conducts a query of storage 144 to determine any photos having a geographic area intersecting with the geographic location. Alternatively or additionally, the search query may identify a photo or video and ask for another photo or video capturing the same location. In this case, content searcher 146 queries storage 144 to identify any other photos or videos having a geographic area intersecting with the geographic area captured in the identified photo or video in the request from application 104. Alternatively or additionally, a user may set a notification service such that content searcher 146 may repeatedly query for a geographic location and notify the user when a still photo or video capturing the area is found in storage 144. Further discussion of the operation of content searcher 146 is described below with respect to, for example, FIGS. 3B, 7, and 8.

Figure 2:
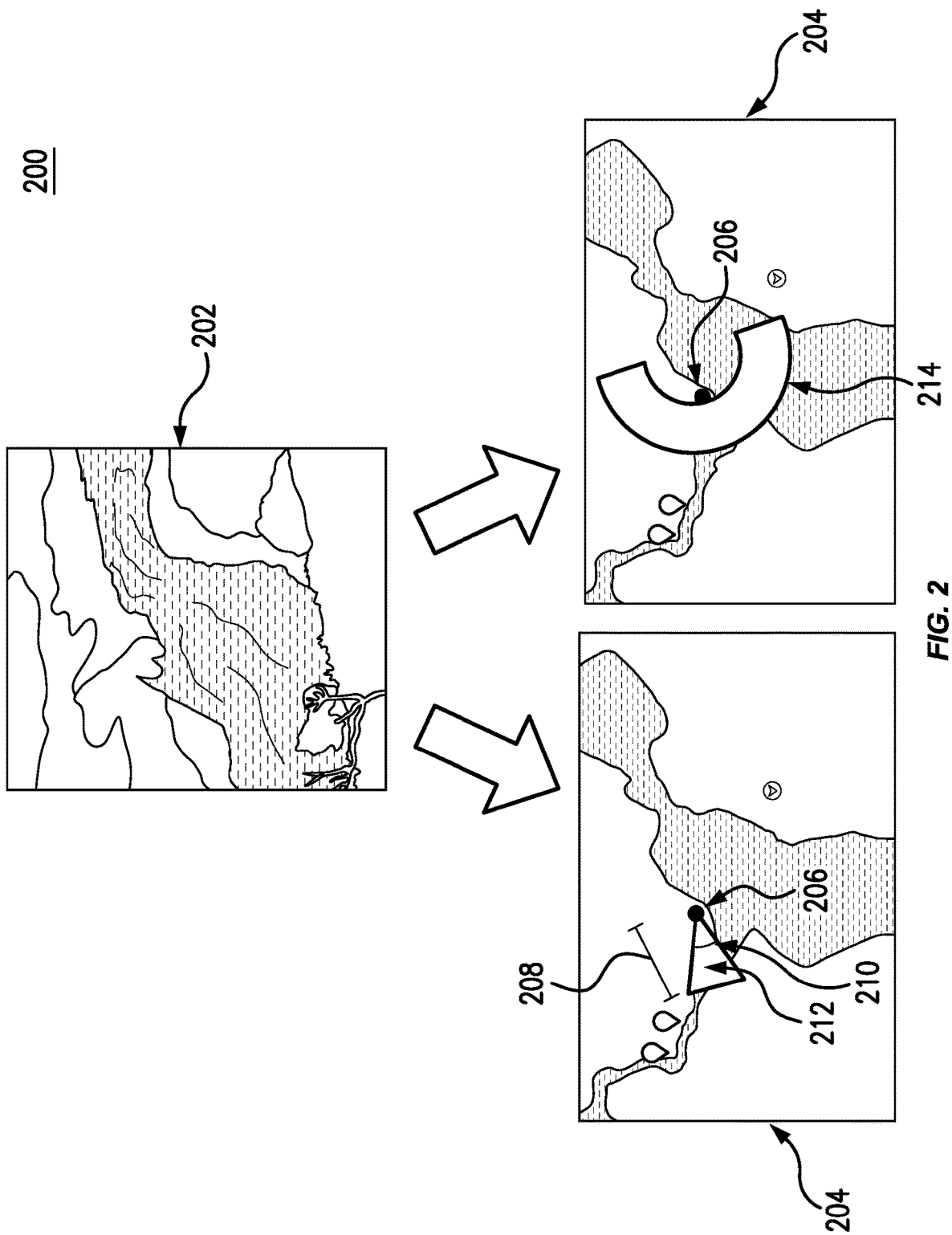
FIG. 2 is a diagram illustrating contents of a photographic image being geolocated.
Figure 3:
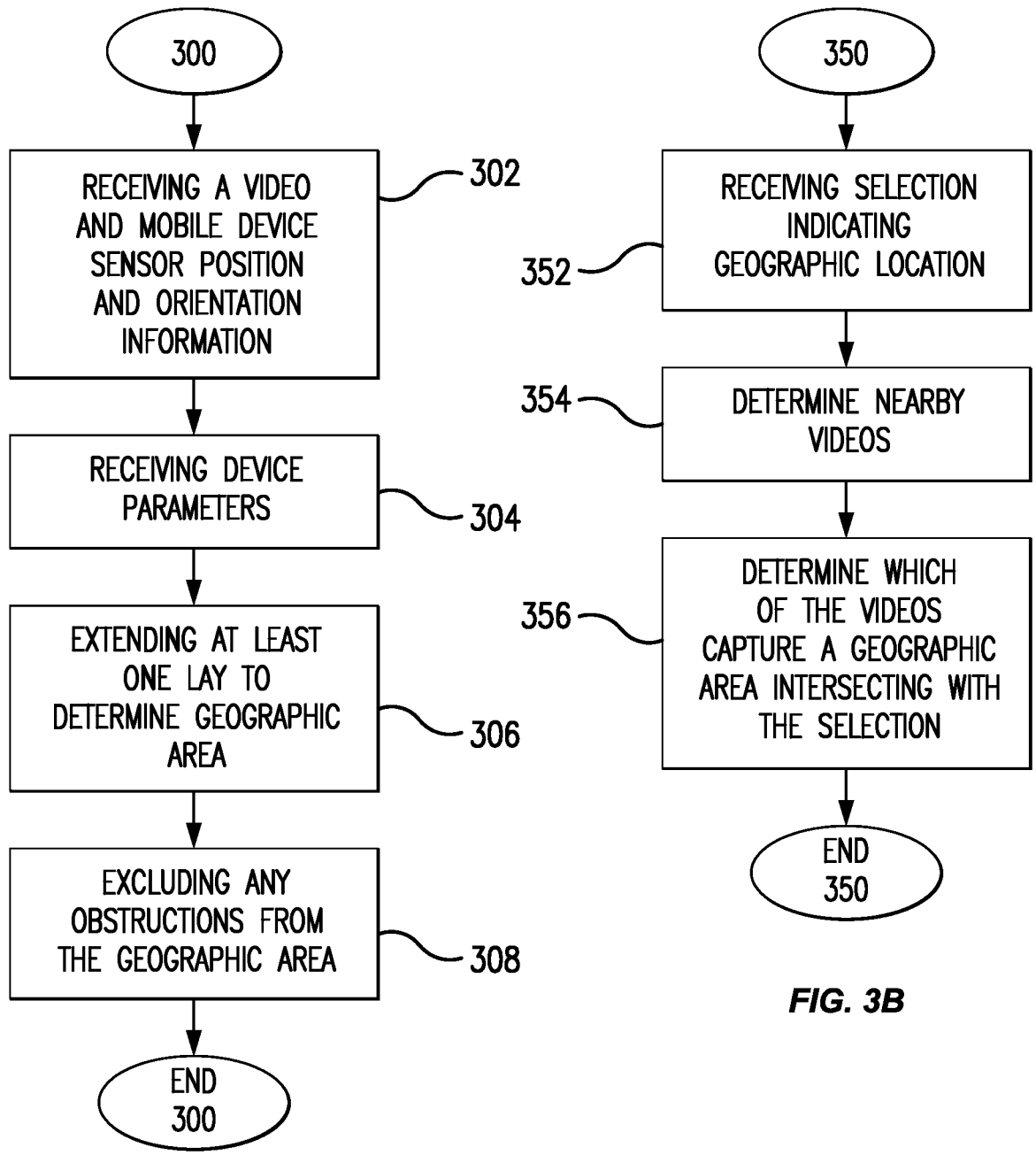
FIG. 3A is a method for geolocating contents of a photographic image, which may be used in operation of the system of FIG. 1.
FIG. 3B is a method for searching for new videos, which may be used in operation of the system in FIG. 1.

FIG. 2 is a diagram 200 illustrating contents of a photographic image being geolocated. Diagram 200 illustrates a photographic image 202. Image 202 is user-generated content captured from a camera on a mobile device. It may be a still photographic image or a video image. As mentioned above, image 202 is captured from a position 206. Position 206 may be captured using the sensor data available from the mobile device.

As described above, geographic area determiner 142 uses sensor and parameter information to determine a geographic area 212 or geographic area 214. Geographic area 212 represents an example geographic area captured in a still photographic image, and geographic area 214 represents an example geographic area captured in a video.

Map 204 may be presented to a user of a mobile device by, for example, an application. Map 204 may be a symbolic depiction of relationships between elements of a geographic space. For example, it may be a two-dimensional representation of the surface of the world. Another example is map 204 may be a satellite image, such as an orthographic or nadir-projected satellite image. In further examples, map 204 may be three-dimensional such as the virtual world presented in the Google Earth application available from Alphabet, Inc. of Mountain View, Calif.

As shown in diagram 200, superimposed on map 204 is geographic area 212 or 214. Geographic area 212 or 214 shown in a gradient form such that those objects in the foreground that have a higher pixel density will be shaded in one color and those objects at a distance with a lower pixel density which will be shaded in a different color. Also superimposed on map 204 may be a marker to designate position 206. In this way, a user can see the position 206 where image 202 is taken and can also see what geographic area is captured in image 202.

Geographic area 212 and 214 may be determined using the sensor and properties information captured from the mobile device, as described above with respect to FIG. 1. As shown in diagram 200, geographic area 212 is substantially an isosceles triangle. Angle of view 210 may be specified by or determined based on the camera's field of view, as described above with respect to FIG. 1. In the case of a two-dimensional geographic area 212, angle of view 210 may be the angle of the camera's horizontal field of view and may be the vertex angle of the isosceles triangle. By extending rays separated by angle of view 210 out from position 206, the two sides of geographic area 212 are bounded. The final side may be set according to the depth 208 of geographic area 212. Depth 208 may be the height of the isosceles triangle and may be determined as a function of image 202's pixel density such that a greater resolution results in greater depth 208 and vice versa. In this way, geographic area 212 is determined based on camera properties and sensor data of a mobile device.

Geographic area 214 is a geographic area captured by a video. Geographic area 214 may be determined by first determining a geographic area captured by individual frames of the video. The geographic areas for the respective individual frames are determined as described above for geographic area 212. Then, the geographic areas for the respective individual frames are merged to form geographic area 214.

In alternative embodiments, not shown, geographic area 212 may be other two-dimensional shapes, such as trapezoidal. Further, as will be further described below with respect to, for example, FIGS. 4 and 5, the geographic area 212 or 214 can be three-dimensional as described below.

FIG. 3A is a method 300 for geolocating contents of a photographic image, which may be used in operation of the system of FIG. 1.

At step 302, a video and corresponding sensor information is received. The sensor information describes the position and orientation of the mobile device when it is capturing the video.

At step 304, corresponding device parameters are received. As described above, the device parameters may describe attributes of the device when the device captured the video.

At step 306, geographic areas corresponding to respective frames of the video are determined. To determine a geographic area for an image, at least one ray from the mobile device's position is extended at an angle corresponding to an angle of view of the camera. This is described above with respect to a two-dimensional geographic area. How such a ray can be extended for a three-dimensional geographic area is illustrated in FIG. 4.

Figure 4:
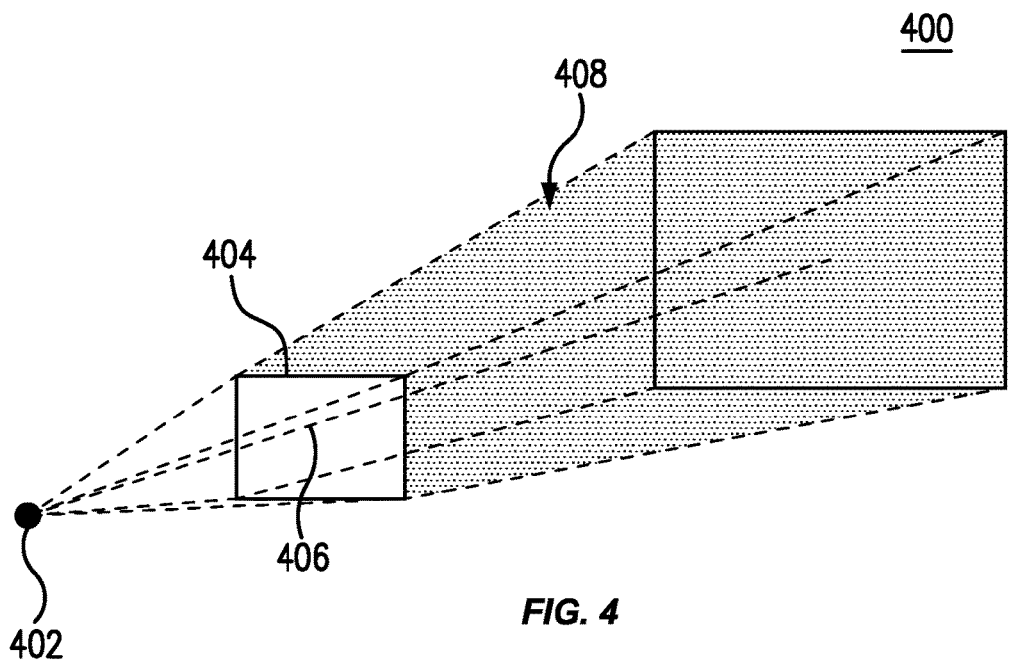
FIG. 4 is a diagram illustrating determining a geographic area of contents of a photographic image in three dimensions, according to an embodiment.

FIG. 4 shows a diagram 400 illustrating determining a geographic area of contents of a photographic image in three dimensions, according to an embodiment. The image is captured from a position 402. From position 402, a center ray 406 extends at an angle represented by the pan, tilt, and roll of the camera when it took the image. Rays 408A-D are extended in a way that deviates from center ray 406 according to the camera's field of view information, including the camera's horizontal and vertical angle of view. Rays 408A-D form vertices of a frustum 408.

Frustum 408 may have a top 404 and a bottom 408. Top 404 may be positioned according to a focal length of the camera that took the image. Bottom 408 may be positioned, as described above, according to a pixel density of the image. In this way, frustum 408 may be determined at step 306 in FIG. 3 to determine a geographic area corresponding to an image.

In some embodiments, the geographic area determined at step 306 may be further modified at step 308 to exclude areas obscured in the image. This is illustrated, for example, in FIG. 5.

Figure 5:
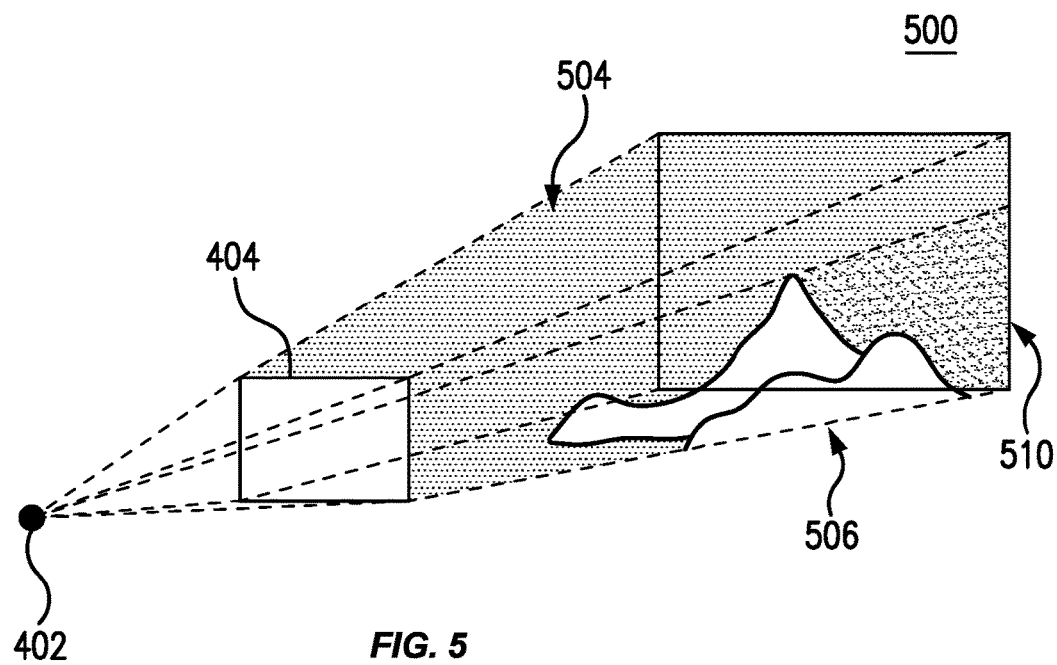
FIG. 5 is a diagram illustrating how obstructions are removed from the geographic area, according to an embodiment.

FIG. 5 is a diagram 500 illustrating how obstructions are removed from the position 402 determined in FIG. 4, according to an embodiment. As shown in diagram 500, data representing a three-dimensional structure 506 is retrieved. Such data may be available from publicly available databases such as the United States Geographical Service and the polygon database available from SafeGraph Inc. of San Francisco, Calif. Three-dimensional structure 506 may represent, for example, buildings, topography, and/or terrain.

As illustrated in diagram 500, a ray intersecting an edge of three-dimensional geographic structure 506 is determined. The ray is extended from position 402. This projection onto three-dimensional structure 506 defines an obstructed area 510 in the camera's field of view. Obstructed area 510 is removed from position 402 to determine a geographic area 504. In this way, a geographic area 504 describing what is captured in an image is determined.

By combining multiple geographic areas for frames of a video, an area captured by a video can be determined. In one embodiment, a geographic area may be determined for each frame of a video. In an alternative embodiment, the frames may be sampled.

FIG. 3B is a method 350 for searching for videos, which may be used in operation of the system in FIG. 1.

Method 350 begins at step 352 by receiving a selection indicating a geographic location. In one embodiment, the selection may be a specific geographic position. For example, a user may select a point on a map such that the point corresponds to latitude, longitude, and possibly altitude values. In another embodiment, the selection may be of an image or video that has a corresponding geographic area determined as described above with respect to FIG. 3A.

At step 354, nearby still images and/or videos are retrieved from a database. The nearby still images and/or videos may be within a predefined radius of the geographic location selected in step 352. This retrieval step may reduce the processing needed because it avoids having to ray trace as many videos.

After the nearby images and/or videos are retrieved, the nearby images and/or videos are analyzed at step 356 to determine which images and/or videos captured a geographic area intersecting with the selection in step 352. In addition, weather sensor data may be used to help the search engine make more precise seasonal and weather related searches. For example, if a user is looking for sunny pictures then most likely those will occur with high barometric pressure. Additionally or alternative, among intersecting videos or images, those closer to the camera may be retrieved first. This intersection analysis is illustrated in FIGS. 6 and 7.

Figure 6:
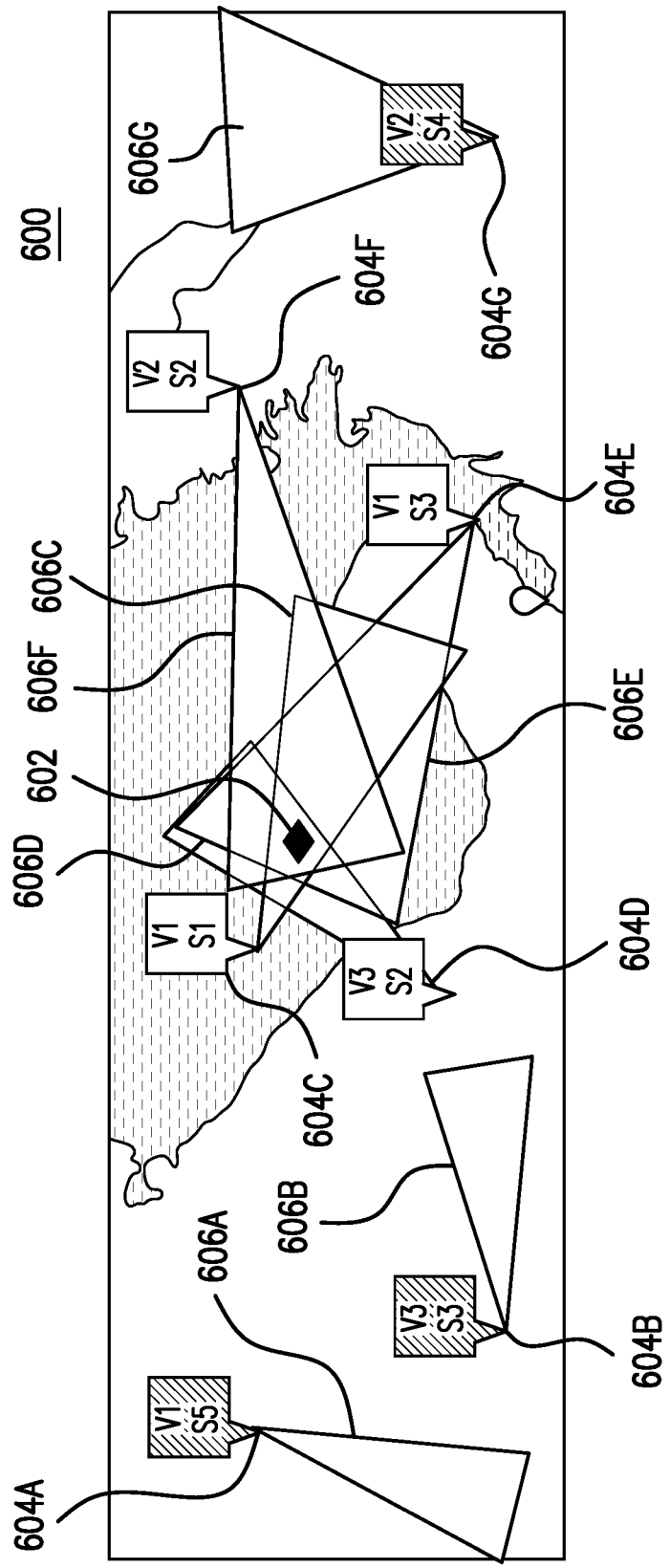
FIG. 6 is a diagram illustrating how videos with intersecting geographic areas may be determined, according to an embodiment.
Figure 7:
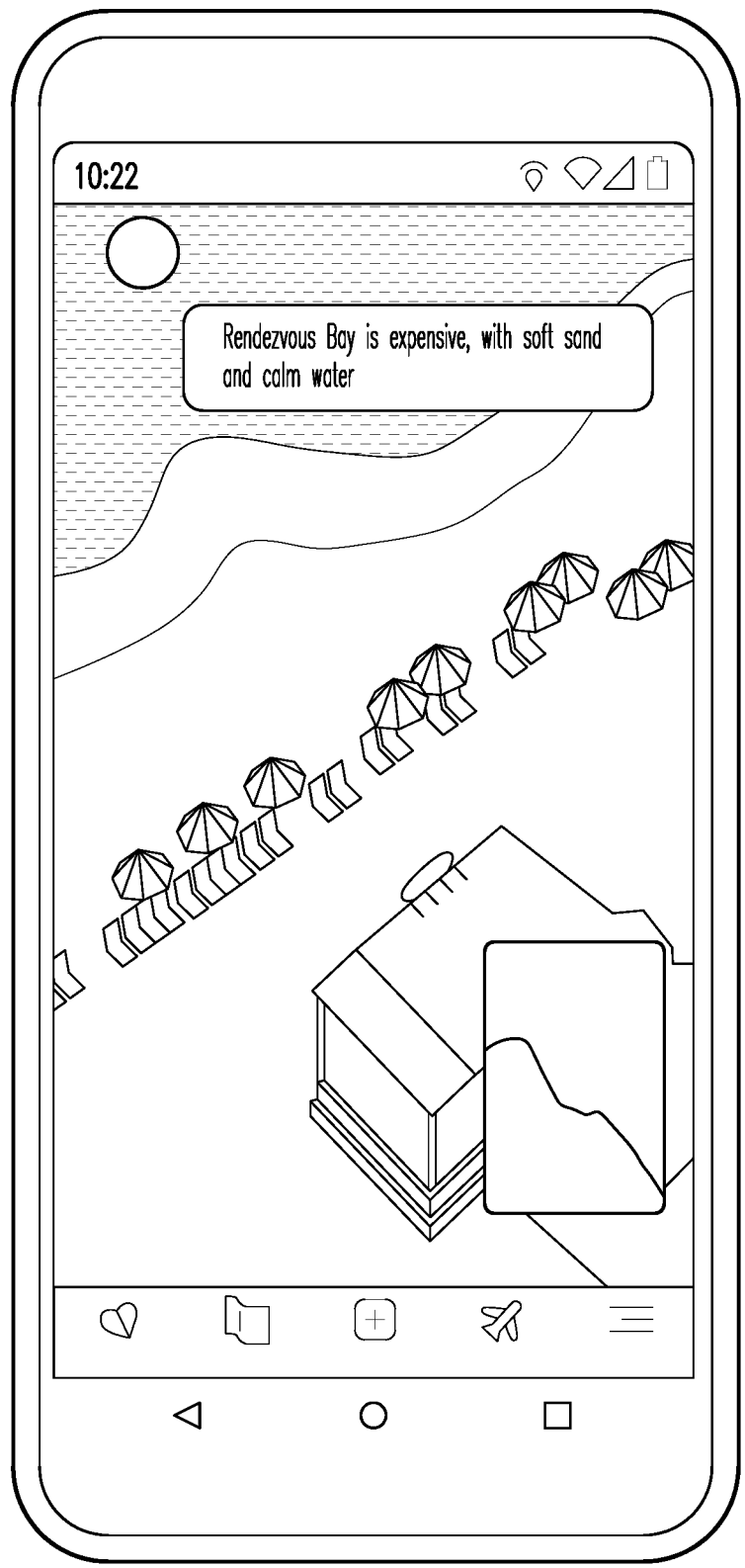
FIG. 7 is an example interface of a mobile application illustrating a photo or video, according to an embodiment.

FIG. 6 is a diagram 600 illustrating how videos with intersecting geographic areas may be determined according to an embodiment. Diagram 600 illustrates a plurality of videos 604A-G and corresponding geographic areas 606A-G.

In one embodiment, a user selects a position 602. In that embodiment, an algorithm such as a point-in-polygon (PIP) algorithm may be used to determine whether position 602 lies inside the polygons representing geographic areas 606A-G. As a skilled artisan would recognize, examples of point-in-polygon algorithms include a ray-casting algorithm and a winding number algorithm. As illustrated in diagram 600, areas 606C-F include position 602, and areas 606A, B, and G do not. Thus, corresponding videos 604C-F are determined as including position 602, and videos 604C-F may be displayed to the user in a serial fashion.

In another embodiment, a user selects a video, such as video 604C, to query which videos include overlapping subject matter. A skilled artisan would recognize that a number of known algorithms may be applied to answer this question, including the separating axis theorem. Again, as illustrated in diagram 600, areas 606C-F include position 602, and areas 606A, B, and G do not. Thus, corresponding videos 604C-F are determined as including position 602, and videos 604C-F may be displayed to the user in a serial fashion.

Figure 8:
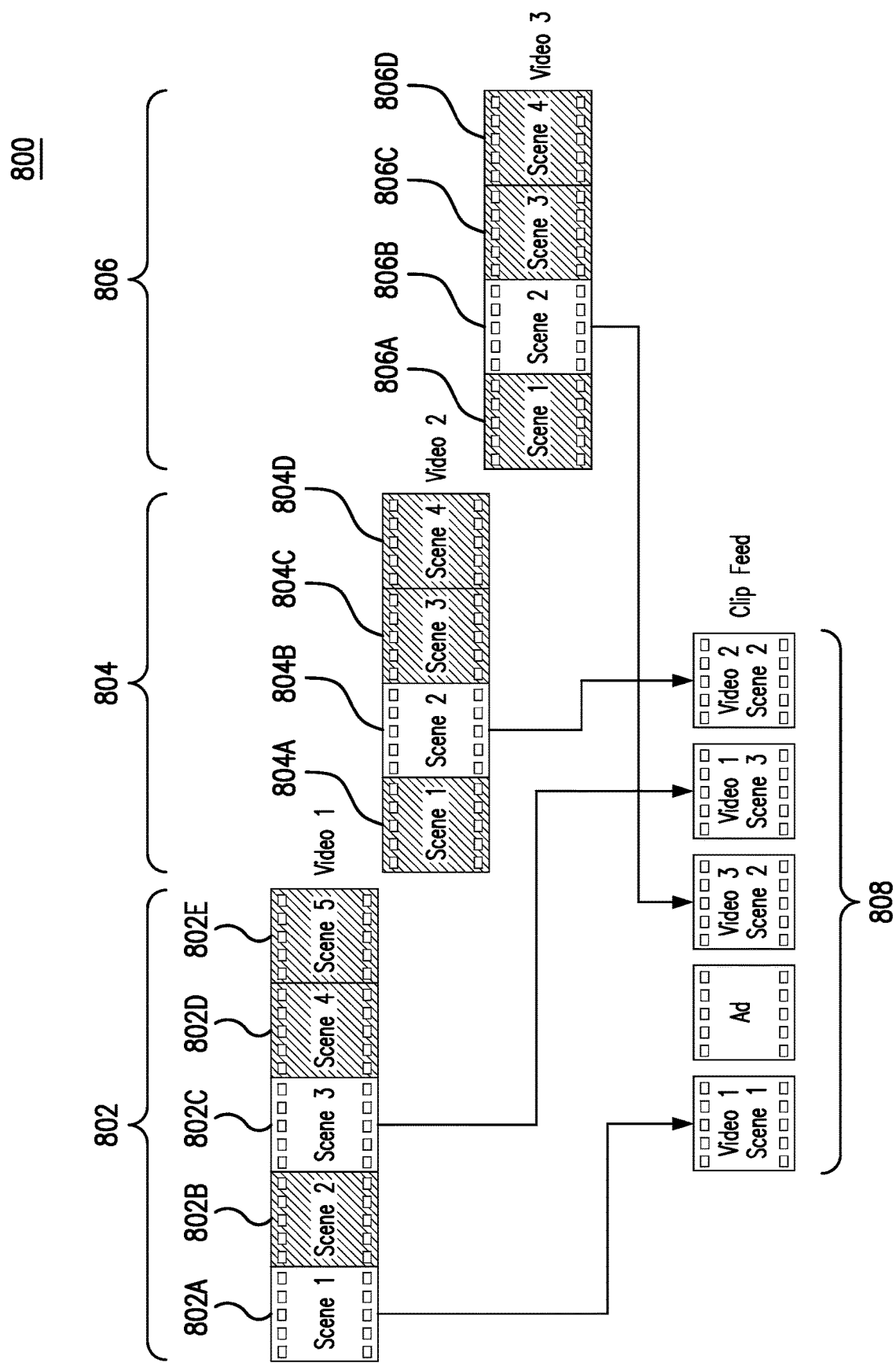
FIG. 8 is a diagram showing how segments of video are spliced together into a clip feed that shows a geographic area to a user, according to an embodiment.

In either example, the videos may be displayed in an interface, such as is illustrated in interface 800 in FIG. 8. To switch between videos 604C-F, or to toggle to the next videos 604C-F, a user may swipe up on the interface 800.

After videos 604C-F are displayed to a user, it is determined that no more videos exist in storage that intersect with the selected geographic location and have yet to be provided for display. In that circumstance, a video nearest the selected geographic location may be presented. In the example in diagram 600, video 604B may be displayed next, then video 604A, and finally video 604G.

The example in FIG. 6 illustrates determining whether two-dimensional geographic areas intersect, but a skilled artisan would recognize the same principles can be used for three-dimensional geographic areas such as those illustrated in FIGS. 4 and 5.

Not only can the methods described with respect to FIGS. 3A and 3B be applied to entire videos, they can also be applied to portions of videos as illustrated in FIG. 8.

FIG. 8 is a diagram 800 showing how segments of video are spliced together into a clip feed that shows a geographic area to a user, according to an embodiment.

Diagram 800 illustrates three videos: 802, 804, and 806. Each video includes a plurality of segments: video 802 includes segments 802A-E; video 804 includes segments 804A-D; and video 806 includes segments 806A-D. Each segment represents a scene. For example, each segment may be a continuously shot video that is later edited together into a larger video. Each segment may be shot from the same general geographic location. Accordingly, system 100 in FIG. 1 may determine a geographic area corresponding to each individual segment as described with respect to FIG. 3A, and those geographic areas are searched as described with respect to FIG. 3B. Together, segments capturing a common geographic location are assembled into clip feed 808.

The databases disclosed herein may be any stored type of structured memory, including a persistent memory. For example, this database may be implemented as a relational database or file system. Mobile device 102 and server 140 both include processors and memory, including a nonvolatile computer readable medium.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for geolocating contents of a video, comprising:
   (a) receiving a video captured by a camera on a mobile device, the video includes a plurality of frames;
   (b) receiving parameters captured by sensors on the mobile device, the parameters describing the mobile device's position and orientation while the mobile device captured the video, wherein the parameters describe the mobile device's position and orientation while the mobile device captured each of the plurality of frames;
   for each respective frame from the plurality of frames:
   (c) extending at least one ray from the mobile device's position specified in the parameters for the respective frame and at an angle based on the mobile device's orientation specified in the parameters for the respective frame and an angle of view of the camera; and
   (d) based on the ray determined in (c), determining a geographic area captured within the respective frame; and
   (e) merging the geographic areas determined in (d) to determine a geographic area captured within the video.

2. The method of claim 1, further comprising:
   retrieving data representing a three-dimensional geographic structure;
   determining, based on the data, an intersection between the at least one ray and the three-dimensional geographic structure, the intersection representing an obstructed area in the camera's field of view; and
   determining the geographic area determined in (e) to avoid the obstructed area.

3. The method of claim 2, wherein the three-dimensional geographic structure includes at least one of data representing a topography or data representing a building structure.

4. The method of claim 1, wherein the determining (d) comprises:
   determining a pixel density of a frame of the video; and
   determining, based on the pixel density, a distance for the geographic area determined in (d) to extend the mobile device's position such that the distance is longer when the pixel density is greater.

5. The method of claim 1, further comprising:
   rendering the geographic area determined in (e) onto a map to illustrate the geographic area captured in the video.

6. The method of claim 1, wherein the video comprises a plurality of video segments each captured at a substantially different time and location, further comprising:
   (f) receiving a selected geographic location;
   for each of the plurality of video segments:
   (g) repeating steps (c)-(e) to determine a geographic area captured within the respective video segment;
   (h) determining whether the selected geographic location is within the geographic area determined in (e) for the respective video segment;
   (i) when the selected geographic location is determined in (h) to be within the geographic area of the respective video segment, incorporating the video segment into a new video of the selected geographic location for display.

7. The method of claim 1, wherein the geographic area determined in (d) is a three-dimensional view frustum and the video is a first video included in a plurality of videos stored in a database, further comprising:
   (f) receiving a selection of the first video from the plurality of videos;
   (g) repeating steps (c)-(e) to determine a geographic area captured within a second video in the plurality of videos;
   (h) determining whether the geographic area of the first video intersects with the geographic area of the second video determined on (f);
   (i) when the selected geographic location is within the geographic area of the respective video, providing the other video for display.

8. The method of claim 7, wherein the geographic area captured by the first video is a first three-dimensional area, and wherein the geographic area captured by the other video is a second three-dimensional area, wherein the determining (h) comprises determining whether the first and second three-dimensional areas intersect.

9. The method of claim 8, wherein the geographic area determined in (d) is a frustum specified by a pan of the camera, a tilt of the camera, a roll of the camera, the position of the camera, and the angle of view of the camera when the camera captured the respective frame.

10. The method of claim 7, wherein the determining (h) comprises selecting, from the plurality of videos, at least one video within a radius from the position.

11. The method of claim 7, wherein the selection is a swipe up gesture on a touch screen of a mobile device.

12. The method of claim 7, further comprising:
(j) determining whether the plurality of videos includes no more intersecting videos that have not yet been provided for display; and
(k) when the plurality of videos includes no more intersecting videos that have not yet been provided for display, selecting for display a video near the position.

13. The method of claim 1, wherein the video is included in a plurality of videos stored in a database and wherein each video comprises a plurality of video segments, each captured at a substantially different time and location, further comprising:
(f) receiving a selection of a video segment from the plurality of video segments for the plurality of videos, wherein the receiving the parameters (b) comprises receiving the parameters describing the mobile device's position and orientation while the mobile device captured the selected video segment, wherein the extending at least one ray (c) comprises extending the ray to determine the geographic area captured by the video segment;
for each of the other plurality of video segments in the plurality of videos:
(g) repeating the steps (c)-(e) to determine a geographic area captured within the respective video segment;
(h) determining whether the geographic area of the video segment selected in (e) intersects with the geographic area of the respective video segment;
(i) when the selected geographic location is within the geographic area of the respective video segment, incorporating the video segment into a new video of the selected geographic location for display.

14. A non-volatile, computer-readable device storing instructions that, when executed by a processor, cause the processor to perform a method for geolocating contents of a video, the method comprising the steps of:
(a) receiving a video captured by a camera on a mobile device, the video includes a plurality of frames;
(b) receiving parameters captured by sensors on the mobile device, the parameters describing the mobile device's position and orientation while the mobile device captured the video wherein the parameters describe the mobile device's position and orientation while the mobile device captured each of the plurality of frames;
for each respective frame from the plurality of frames:
(c) extending at least one ray from the mobile device's position specified in the parameters for the respective frame and at an angle based on the mobile device's orientation specified in the parameters for the respective frame and an angle of view of the camera; and
(d) based on the ray determined in (c), determining a geographic area captured within the respective frame; and
(e) merging the geographic areas determined in (d) to determine a geographic area captured within the video.

15. The device of claim 14, the method further comprising:
retrieving data representing a three-dimensional geographic structure;
determining, based on the data, an intersection between the at least one ray and the three-dimensional geographic structure, the intersection representing an obstructed area in the camera's field of view; and
determining the geographic area determined in (e) to avoid the obstructed area.

16. The device of claim 15, wherein the three-dimensional geographic structure includes at least one of data representing a topography or data representing a building structure.

17. The device of claim 15, wherein the determining (d) comprises:
determining a pixel density of a frame of the video; and
determining, based on the pixel density, a distance for the geographic area determined in (d) to extend the mobile device's position such that the distance is longer when the pixel density is greater.

* * * * *